United States Patent
Kim et al.

(10) Patent No.: US 12,546,683 B2
(45) Date of Patent: Feb. 10, 2026

(54) APPARATUS FOR EVALUATING PERFORMANCE OF SPEED REDUCER

(71) Applicant: KOREA INSTITUTE OF ROBOT AND CONVERGENCE, Pohang-si (KR)

(72) Inventors: Jong Geol Kim, Pohang-si (KR); Maolin Jin, Pohang-si (KR); Ju Seong Shin, Pohang-si (KR); Ju Hyun Pyo, Pohang-si (KR); Kap Ho Seo, Pohang-si (KR)

(73) Assignee: KOREA INSTITUTE OF ROBOT AND CONVERGENCE, Pohang-si (KR)

( * ) Notice: Subject to any disclaimer, the term of this patent is extended or adjusted under 35 U.S.C. 154(b) by 397 days.

(21) Appl. No.: 18/265,784

(22) PCT Filed: Jan. 7, 2021

(86) PCT No.: PCT/KR2021/000215
§ 371 (c)(1),
(2) Date: Jun. 7, 2023

(87) PCT Pub. No.: WO2022/149632
PCT Pub. Date: Jul. 14, 2022

(65) Prior Publication Data
US 2024/0060854 A1   Feb. 22, 2024

(51) Int. Cl.
*G01M 13/025*   (2019.01)
(52) U.S. Cl.
CPC .................. *G01M 13/025* (2013.01)

(58) Field of Classification Search
CPC .................................................. G01M 13/025
See application file for complete search history.

(56) References Cited

U.S. PATENT DOCUMENTS

| 4,346,850 A * | 8/1982 | Westergaard ........... B02C 18/24 |
| | | 241/230 |
| 2018/0291995 A1* | 10/2018 | Hayashibara ......... F16H 49/001 |
| 2022/0089022 A1* | 3/2022 | Kusznieryk ............... F16H 3/54 |

FOREIGN PATENT DOCUMENTS

| JP | H05-052704 A | 3/1993 |
| KR | 10-2006-0108006 A | 10/2006 |

(Continued)

OTHER PUBLICATIONS

International Search Report issued for PCT/KR2021/000215, dated Sep. 8, 2021 with English translation.

(Continued)

*Primary Examiner* — Eric S. McCall
(74) *Attorney, Agent, or Firm* — Westman, Champlin & Koehler, P.A.; Amanda M. Prose

(57) ABSTRACT

An apparatus for evaluating performance of a speed reducer, of the present disclosure, includes: a support frame; a base plate mounted on the support frame; a speed reducer to be evaluated, mounted on the base plate; an input unit, which is mounted on an input-side rotary shaft connected to the speed reducer and includes a driving motor, a torque sensor and an encoder; an output unit, which is mounted on an output-side rotary shaft connected to the speed reducer and includes an encoder and a torque sensor; an output terminal motor selectively connected to the output-side rotary shaft; and a rated torque brake selectively connected to the output-side rotary shaft.

10 Claims, 6 Drawing Sheets

(56) References Cited

FOREIGN PATENT DOCUMENTS

| | | |
|---|---|---|
| KR | 10-2009-0082792 A | 7/2009 |
| KR | 10-2009-0082793 A | 7/2009 |
| KR | 10-0926574 B1 | 11/2009 |
| KR | 10-1552299 B1 | 9/2015 |
| KR | 10-1833520 B1 | 3/2018 |
| KR | 10-2021-0065574 A | 6/2021 |

OTHER PUBLICATIONS

Written Opinion of the International Searching Authority issued for PCT/KR2021/000215, dated Sep. 8, 2021.

\* cited by examiner

APPARATUS FOR EVALUATING PERFORMANCE OF SPEED REDUCER

CROSS-REFERENCE TO RELATED APPLICATION

This Application is a Section 371 National Stage Application of International Application No. PCT/KR2021/000215, filed Jan. 7, 2021 and published as WO 2022/149632 A1 on Jul. 14, 2022, in Korean, the contents of which are hereby incorporated by reference in their entirety.

TECHNICAL FIELD

The present disclosure relates to an apparatus for evaluating performance of a speed reducer, and more particularly, relates to an apparatus for evaluating performance of a speed reducer capable of measuring angular transmission error, hysteresis, hysteresis loss, repetition precision, ratcheting torque, no-load starting torque, output starting torque, no-load running torque, and efficiency of a harmonic speed reducer.

BACKGROUND ART

Generally, a harmonic speed reducer includes a cylindrical circular spline, a cup-shaped flex spline, and a wave generator. The wave generator generally has an oval shape and is installed at an inner side of the flex spline. The flex spline with which the wave generator is equipped is installed at an inner circumferential surface of the circular spline. The inner circumferential surface of the circular spline and an outer circumferential surface of the flex spline are typically machined in a tooth form to prevent a slip from occurring.

The harmonic speed reducer is also referred to as a strain wave speed reducer, and is widely used for joints such as robot arms as a typical example.

The harmonic speed reducer needs to be checked for basic performance and quality periodically during development and mass production.

The apparatus for evaluating performance of a harmonic speed reducer according to the related art is configured to test one or two performances of a speed reducer, such as torque, stiffness, and efficiency. Hence, there is an issue in that each evaluation item of the speed reducer needs to be tested through a separate test apparatus.

DISCLOSURE

Technical Problem

An aspect of the present disclosure is directed to providing an apparatus for evaluating performance of a speed reducer capable of measuring and calculating angular transmission error, hysteresis, hysteresis loss, repetition precision, ratcheting torque, no-load starting torque, output starting torque, no-load running torque, and efficiency of a harmonic speed reducer with one evaluation apparatus.

Technical Solution

An apparatus for evaluating performance of a speed reducer of an embodiment of the present disclosure includes: a support frame; a base plate mounted on the support frame wherein the base place is configured such that a speed reducer to be evaluated can be mounted thereon; an input unit, which is mounted on an input-side rotary shaft connected to the speed reducer and includes a driving motor, a torque sensor and an encoder; an output unit, which is mounted on an output-side rotary shaft connected to the speed reducer and includes an encoder and a torque sensor; an output terminal motor selectively connected to the output-side rotary shaft; and a rated torque brake selectively connected to the output-side rotary shaft.

The input unit may further include an input-side sliding plate on which the driving motor, the torque sensor, and the encoder are mounted and which is slidably mounted on the base plate in a rotary shaft direction.

The input-side sliding plate may have a sliding member supported by a sliding rail provided on the base plate on a lower surface.

The output terminal motor and the rated torque brake may further include an output-side sliding plate slidably mounted on the support frame in a direction perpendicular to a rotary shaft.

The output-side sliding plate may have a sliding member supported by a sliding rail provided on the support frame on a lower surface.

The rotary shaft of the output terminal motor and the output-side rotary shaft may be connected by a shaft connection member formed with a fastening hole to which a fastening member is fastened to an outer circumferential surface.

The speed reducer to be evaluated may be a harmonic speed reducer.

The apparatus for evaluating performance may measure and calculate angular transmission error, hysteresis, hysteresis loss, repetition precision, ratcheting torque, no-load starting torque, output starting torque, no-load running torque, and efficiency of a speed reducer.

The apparatus may further include a control unit that controls operation of the driving motor and the output terminal motor and calculates performance of the speed reducer from measured values of the torque sensor and the encoder of the input unit, and the encoder and the torque sensor of the output unit.

A power device supplying power to the apparatus for evaluating performance may include a 220V three phase power supply for driving the driving motor and the output terminal motor, a 220V single phase power supply for controlling a signal of the torque sensor, a 5V SMPS for controlling the encoder, and a 24V SMPS for controlling a brake built in the driving motor.

Advantageous Effects

According to an apparatus for evaluating performance of a speed reducer of an embodiment of the present disclosure, the angular transmission error, hysteresis, hysteresis loss, repetition precision, ratcheting torque, no-load starting torque, output starting torque, no-load running torque, and efficiency of a harmonic speed reducer can be measured and calculated with one evaluation apparatus.

In addition, after a speed reducer to be evaluated is mounted on the evaluation apparatus and a motor or brake is connected, a control unit automatically controls the torque and motion, collects data, and calculates and displays various performance values.

MODE FOR DISCLOSURE

Figure 1:
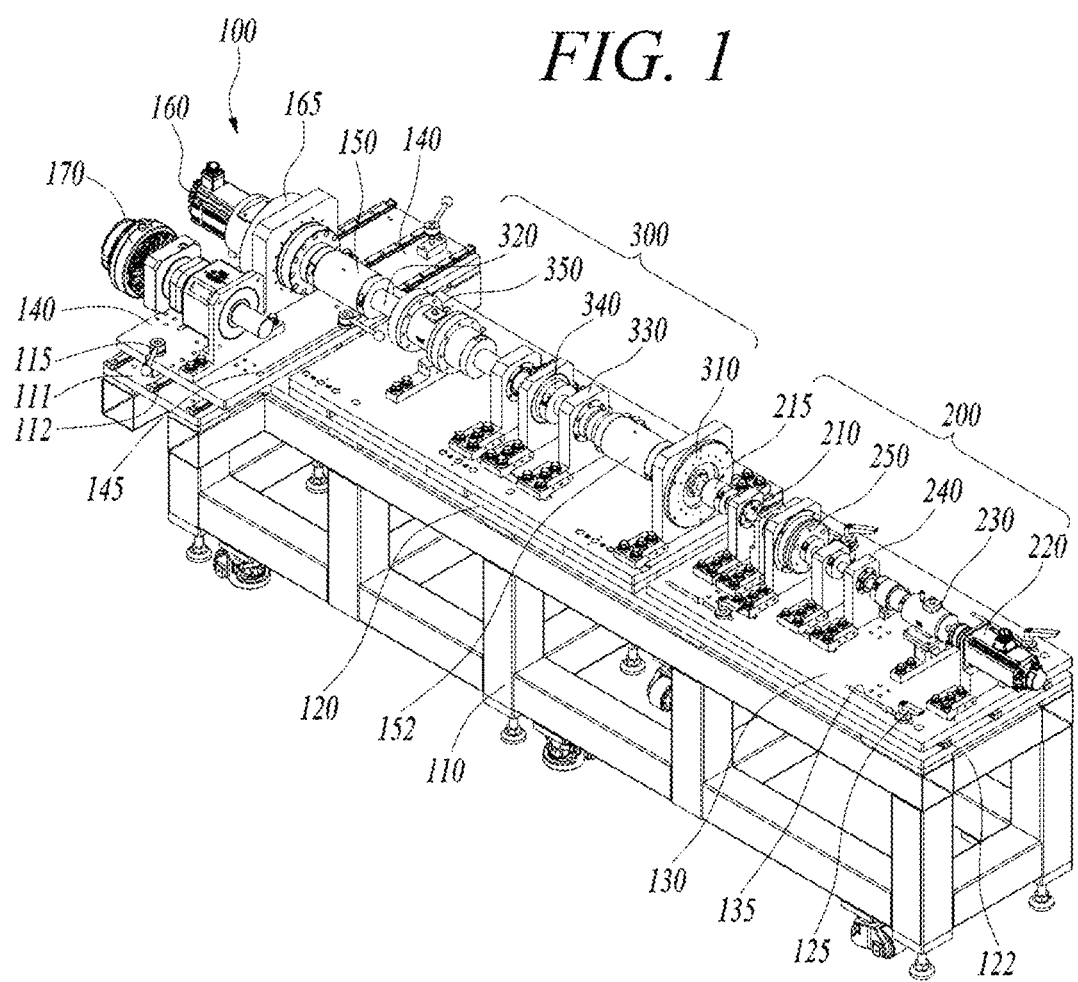
FIG. 1 is a perspective diagram illustrating an apparatus for evaluating performance of a speed reducer according to an embodiment of the present disclosure.

The present disclosure may be modified in various forms and embodied in a variety of different embodiments, and specific embodiments thereof will be illustrated in the drawings and described in detail in the detailed description. However, this is not intended to limit the present disclosure to specific embodiments, and it should be understood that all modifications, equivalents and substitutes included in the spirit and technical scope of the present disclosure are included.

The terms used herein are merely used to describe specific embodiments and are not intended to limit the present disclosure. The terms in singular form may include plural forms unless otherwise specified. It will be understood that the terms "comprising" or "having," when used herein, specify the presence of stated features, integers, steps, operations, elements, components, or combinations thereof, but do not preclude the presence or addition of one or more other features, integers, steps, operations, elements, components, or combinations thereof.

Hereinafter, preferred embodiments of the present disclosure will be described in detail with reference to the accompanying drawings. In this connection, it should be noted that the same reference numerals are used throughout the accompanying drawings to designate the same components. A detailed description of the known function and configuration which may make the gist of the present disclosure obscure will be omitted. Likewise, in the accompanying drawings, some components may be exaggerated, omitted or schematically illustrated.

Figure 2:
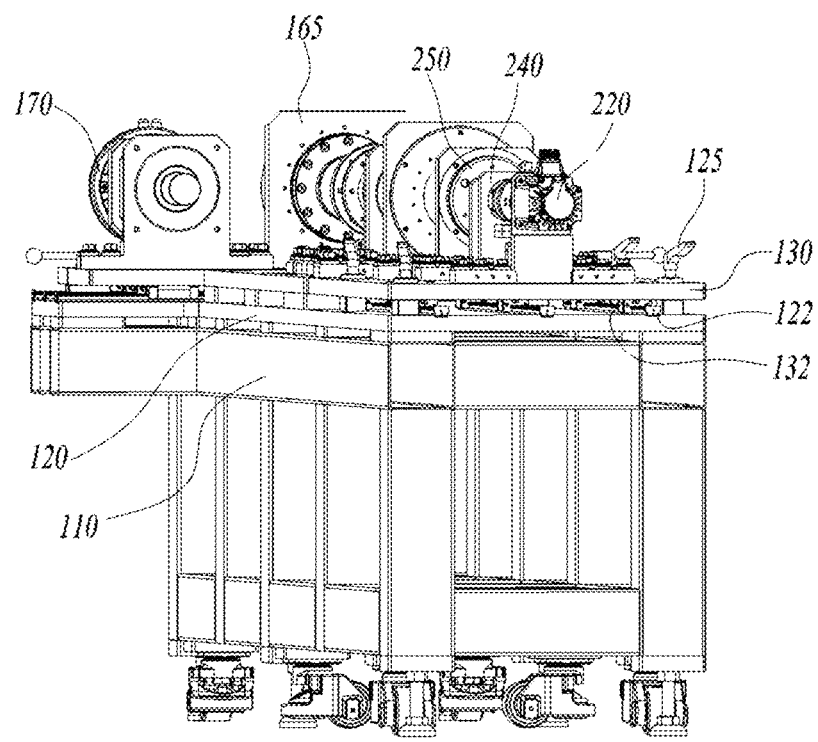
FIG. 2 is a perspective diagram illustrating the apparatus for evaluating performance of FIG. 1 as viewed from left.
Figure 3:
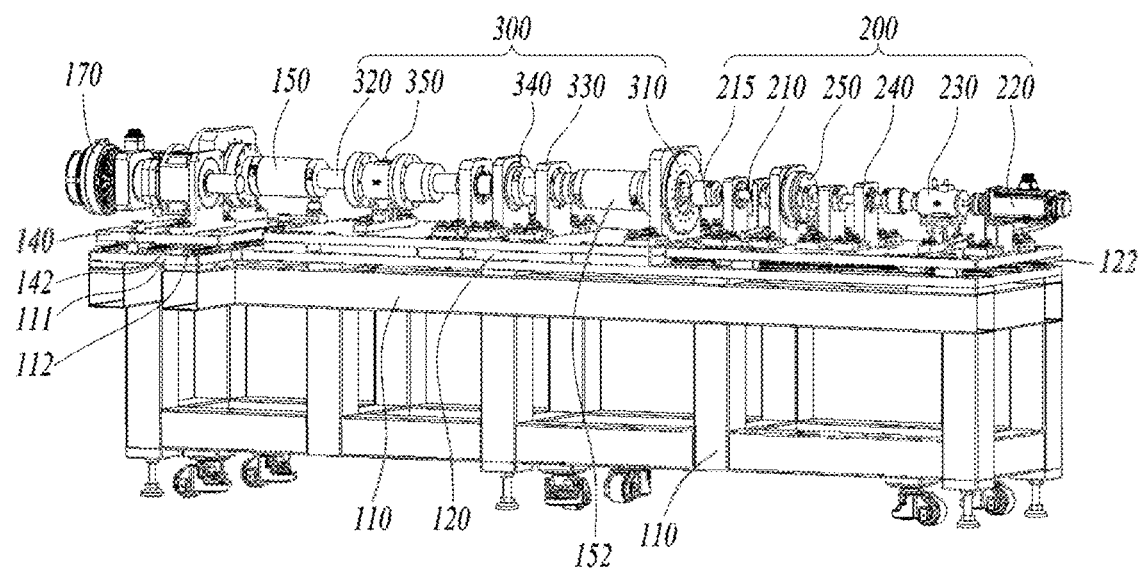
FIG. 3 is a perspective diagram illustrating the apparatus for evaluating performance of FIG. 1 as viewed from front.

FIG. 1 is a perspective diagram illustrating an apparatus for evaluating performance of a speed reducer according to an embodiment of the present disclosure. FIG. 2 is a perspective view diagram illustrating the apparatus for evaluating performance of FIG. 1 as viewed from left. FIG. 3 is a perspective diagram illustrating the apparatus for evaluating performance of FIG. 1 as viewed from front.

An apparatus 100 for evaluating performance of a speed reducer of an embodiment of the present disclosure includes: a support frame 110; a base plate 120 mounted on the support frame and on which a speed reducer 310 to be evaluated is mounted; an input unit 200, which is mounted on an input-side rotary shaft 210 connected to the speed reducer and includes a driving motor 220, a torque sensor 230 and an encoder 250; an output unit 300, which is mounted on an output-side rotary shaft 320 connected to the speed reducer and includes an encoder 340 and a torque sensor 350; an output terminal motor 160 selectively connected to the output-side rotary shaft; and a rated torque brake 170 selectively connected to the output-side rotary shaft.

The support frame 110 may be formed by coupling a plurality of horizontal frames and vertical frames, and may include a plurality of wheels and a plurality of height adjustment legs at a lower end. In the support frame 110, the input unit 200 and the output unit 300 may be formed long in a rotary shaft direction, and an end side of the output-side rotary shaft 320 may be formed long in a direction perpendicular to a rotary shaft.

The base plate 120 may be fixed to an upper surface of the support frame 110 to support the input unit 200 and the output unit 300. In addition, the input unit 200 may further include an input-side sliding plate 130 slidably mounted on an upper right surface of the base plate 120. The base plate 120 may be configured of a plurality of plates such that an upper surface coincides with the input-side sliding plate 130. In other words, the upper surface of the base plate 120 of the output unit 300 may be disposed to coincide with the sliding plate 130 of the input unit 200.

The speed reducer 310 to be evaluated may be mounted on an upper surface of one side of the base plate 120. To this end, as will be described later, a fixing block 312 (see FIG. 4) may be coupled to the upper surface of the base plate 120 by a plurality of fastening members.

The input unit 200 may include the encoder 250, the torque sensor 230, and the driving motor 220 connected to the input-side rotary shaft 210 connected to the speed reducer 310 to be evaluated.

The driving motor 220 may be mounted on a jig coupled to one side of the sliding plate 130 by the plurality of fastening members. As will be described later, the driving motor 220 may be a servo motor that may be precisely driven and controlled by a servo drive.

The torque sensor 230 may also be mounted on a jig coupled to an upper surface of the sliding plate 130 by the plurality of fastening members. As the torque sensor 230, one of a strain gauge torque sensor and an optical torque sensor may be used. The torque sensor 230 may measure the torque applied to the input-side rotary shaft 210 by the driving motor 220.

The encoder 250 may also be mounted on a jig coupled to the upper surface of the sliding plate 130 by the plurality of fastening members. The encoder 250 may measure the rotational speed of the input-side rotary shaft 210.

The input-side rotary shaft 210 may be mounted on the upper surface of the sliding plate 130 by a plurality of rotary shaft support jigs 240 coupled by the plurality of fastening members. Specifically, two jigs 240 may be disposed between the torque sensor 230 and the encoder 250, and two jigs 240 may be disposed on the side of the input-side rotary shaft 210 connected to a rotary shaft of the speed reducer 310.

The output unit 300 may include the encoder 340 and a torque sensor 350 mounted on the output-side rotary shaft 320 connected to the speed reducer 310 mounted on the upper surface of the base plate 120.

The encoder 340 may be mounted on a jig coupled to the upper surface of the base plate 120 by the plurality of fastening members. The encoder 340 may measure the rotational speed of the output-side rotary shaft 320.

The torque sensor 350 may also be mounted on a jig coupled to the upper surface of the base plate 120 by the plurality of fastening members. As the torque sensor 350, one of a strain gauge torque sensor and an optical torque sensor may be used. The torque sensor 350 may measure the torque applied to the output-side rotary shaft 320 by the output terminal motor 160.

In addition, the output-side rotary shaft 320 may be mounted on the upper surface of the base plate 120 by a plurality of rotary shaft support jigs 330 coupled by the plurality of fastening members. Specifically, the output-side rotary shaft 320 may have two rotary shaft support jigs 330 disposed on both sides of the encoder 340.

An output-side sliding plate 140 may be slidably mounted on an output-side end of the support frame 110. To this end, an output terminal support plate 111 is coupled to an upper surface of one side of the support frame 110, and the output-side sliding plate 140 is slidably mounted in a direction perpendicular to a rotary shaft to the output terminal support plate 111.

The rated torque brake 170 and the output terminal motor 160 selectively connected to the output-side rotary shaft may be mounted on an upper surface of the output terminal support plate 111.

As will be described later, the output terminal motor 160 may be a servo motor that may be precisely driven and controlled by a servo drive. A speed reducer 165 may be connected to the output terminal motor 160. The speed reducer 165 may be mounted on a jig mounted on an upper surface of the output-side sliding plate 140 by the plurality of fastening members, and the output terminal motor 160 may be connected to the speed reducer 165.

The output terminal motor 160 may be configured as a servo motor, and the speed reducer 165 may be connected. The rated torque brake 170 may be selectively connected to the output-side rotary shaft 320 when measuring the efficiency of the speed reducer 310.

The input-side sliding plate 130 may have a sliding member 132 supported by a sliding rail 122 provided on the base plate 120 on a lower surface. As illustrated in FIG. 2, three sliding rails 122 may be mounted on an upper surface of the base plate 120 to be elongated in a direction parallel to a rotary shaft. The cross section of the sliding rail 122 may have a shape in which an upper portion is wider than a lower portion. The sliding member 132 is coupled to a lower surface of the input-side sliding plate 130, and two sliding members 132 may be formed to correspond to one sliding rail 122. The sliding member 132 has a groove into which an upper portion of the sliding rail 122 is inserted, so that the sliding member 132 is mounted on the sliding rail 122 and may be moved only in the direction of the rotary shaft.

A plurality of lever slots 135 may be formed through the input-side sliding plate 130, and a plurality of fixing levers 125 corresponding to the plurality of lever slots 135 may be provided in the base plate 120. Four lever slots 135 may be formed in a direction of the rotary shaft near four vertices of the input-side sliding plate 130 formed in a rectangular shape. When the fixing lever 125 passes through the lever slot 135 and turns an upper lever, the input-side sliding plate 130 may be compressed and fixed so as not to move.

In addition, the output-side sliding plate 140 may be provided with a sliding member 142 supported by a sliding rail 112 provided on the output terminal support plate 111 on a lower surface. As illustrated in FIG. 3, three sliding rails 112 may be mounted on an upper surface of the output terminal support plate 111 to be elongated in a direction perpendicular to a rotary shaft. The cross section of the sliding rail 112 may have a shape in which an upper portion is wider than a lower portion. The sliding member 142 is coupled to a lower surface of the output-side sliding plate 140, and two sliding members 142 may be formed to correspond to one sliding rail 112. The sliding member 142 has a groove into which an upper portion of the sliding rail 112 is inserted, so that the sliding member 142 is mounted on the sliding rail 112 and may be moved only in the direction perpendicular to the rotary shaft.

A plurality of lever slots 145 may also be formed through the output-side sliding plate 140, and a plurality of fixing levers 115 corresponding to the plurality of lever slots 145 may be provided in the output terminal support plate 111. Four lever slots 145 may be formed near the four sides of the output-side sliding plate 140 formed in a rectangular shape in a direction perpendicular to a rotary shaft. The lever slot 145 formed on a short side of the output-side sliding plate 140 may be formed in an open form on the short side. The lever slot 145 formed near a long side of the output-side sliding plate 140 may be formed longer than the short side lever slot 145. When a fixing lever 115 passes through the lever slot 145 and turns an upper lever, the output-side sliding plate 140 may be compressed and fixed so as not to move.

Figure 4:
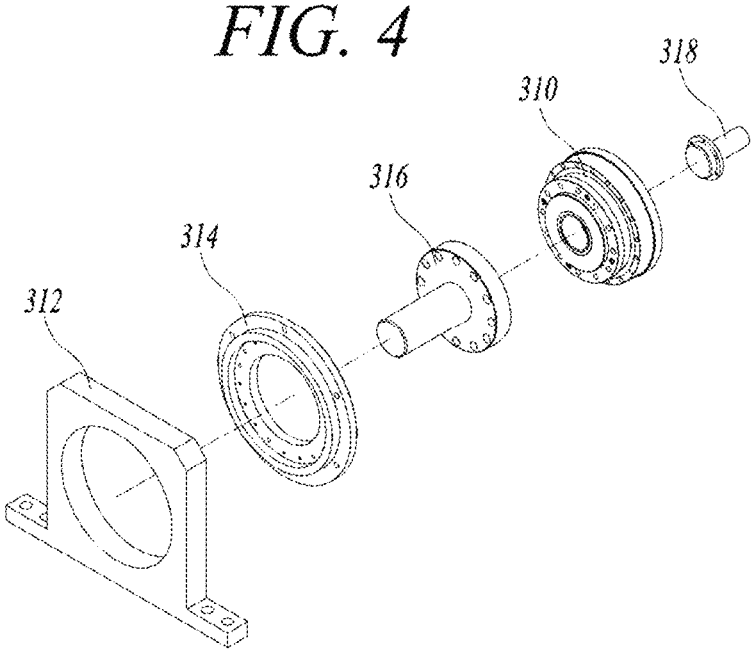
FIG. 4 is an exploded perspective diagram illustrating a structure in which a speed reducer to be evaluated is mounted on an apparatus for evaluating performance.

FIG. 4 is an exploded perspective diagram illustrating a structure in which a speed reducer to be evaluated is mounted on an apparatus for evaluating performance.

The speed reducer 310 to be evaluated may be a harmonic speed reducer, that is, a strain wave speed reducer. First, an output shaft 316 is coupled to the output side of the speed reducer 310. Next, an input shaft 318 is coupled to the input side of the speed reducer 310. Next, a flange 314 is coupled to an outer circumferential surface of the speed reducer 310 to which the output shaft 316 and the input shaft 318 are coupled. Next, the flange 314 assembled with the speed reducer 310 is inserted into the fixing block 312 fixed to the upper surface of the base plate 120 by the plurality of fastening members and mounted.

Figure 5:
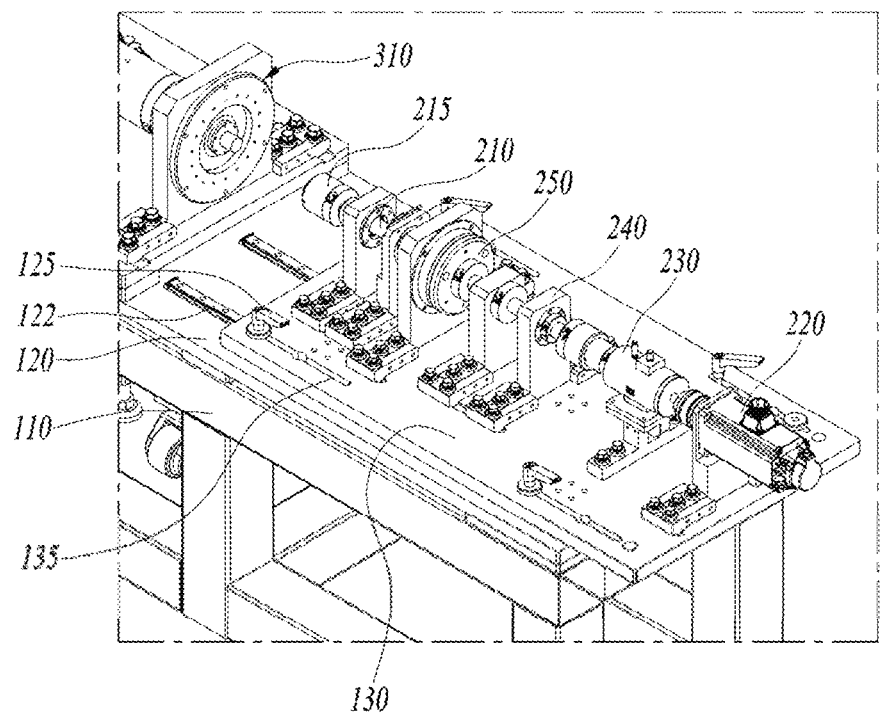
FIG. 5 is a partial perspective diagram illustrating that an input-side rotary shaft is coupled after a speed reducer to be evaluated is mounted on an apparatus for evaluating performance.

FIG. 5 is a partial perspective diagram illustrating that an input-side rotary shaft is coupled after a speed reducer to be evaluated is mounted on an apparatus for evaluating performance.

The input shaft 318 of the speed reducer 310 to be evaluated and the input-side rotary shaft 210 may be shaft-coupled by a shaft connection member 215. The shaft connection member 215 may have a fastening hole into which the fastening member is fastened in a radial direction at an outer circumferential surface of the end of a cylindrical member. Thus, by inserting each end of the input-side rotary shaft 210 and the input shaft 318 into the shaft connection member 215 and fastening the fastening member, the input shaft 318 and the input-side rotary shaft 210 may be shaft-coupled.

As illustrated in FIG. 5, after sliding the input-side sliding plate 130 away from the speed reducer 310, the input shaft 318 and the input-side rotary shaft 210 may be shaft-coupled as described above.

Figure 6:
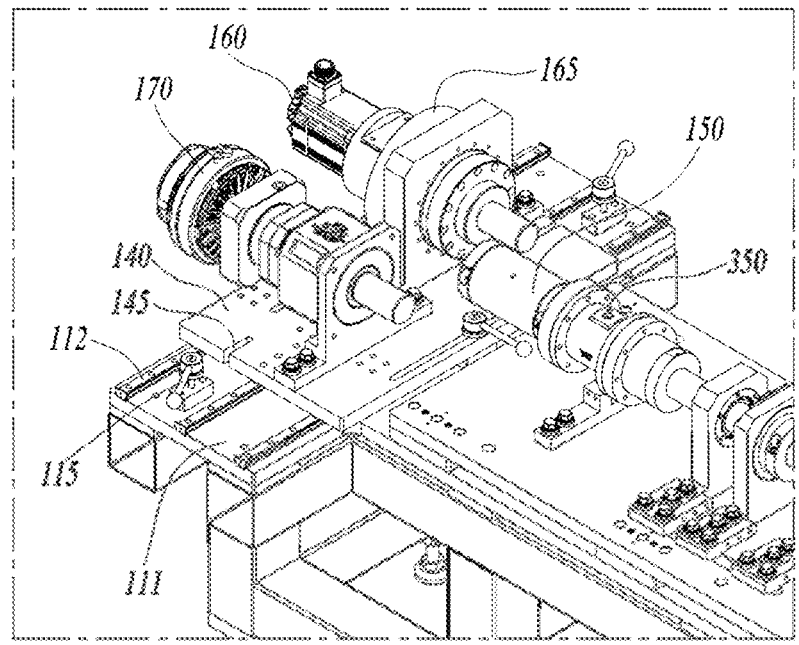
FIG. 6 is a partial perspective diagram illustrating a process of connecting an output-side rotary shaft of an apparatus for evaluating performance to an output terminal motor or a rated torque brake by a shaft connection member.
Figure 7:
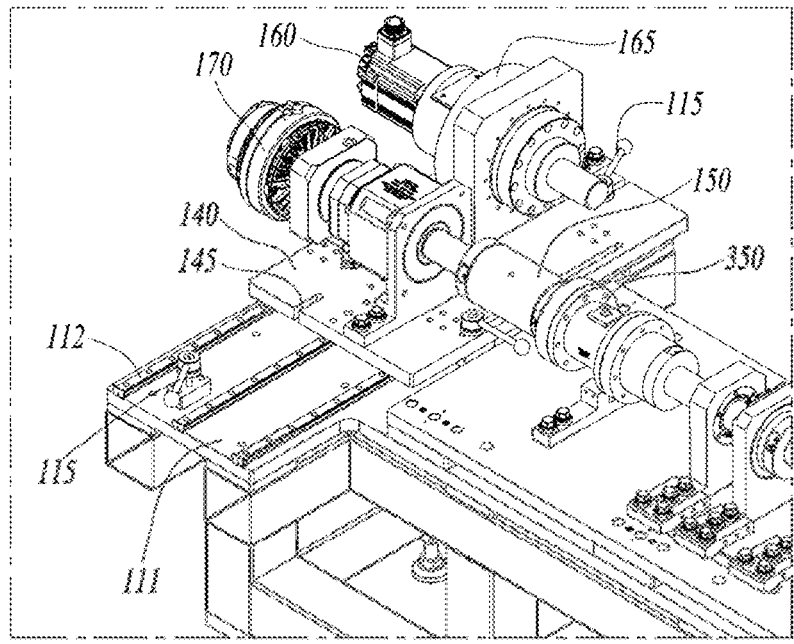
FIG. 7 is a perspective diagram illustrating that an output-side rotary shaft of an apparatus for evaluating performance is coupled to a rated torque brake by a shaft connection member.
Figures 8, 9:
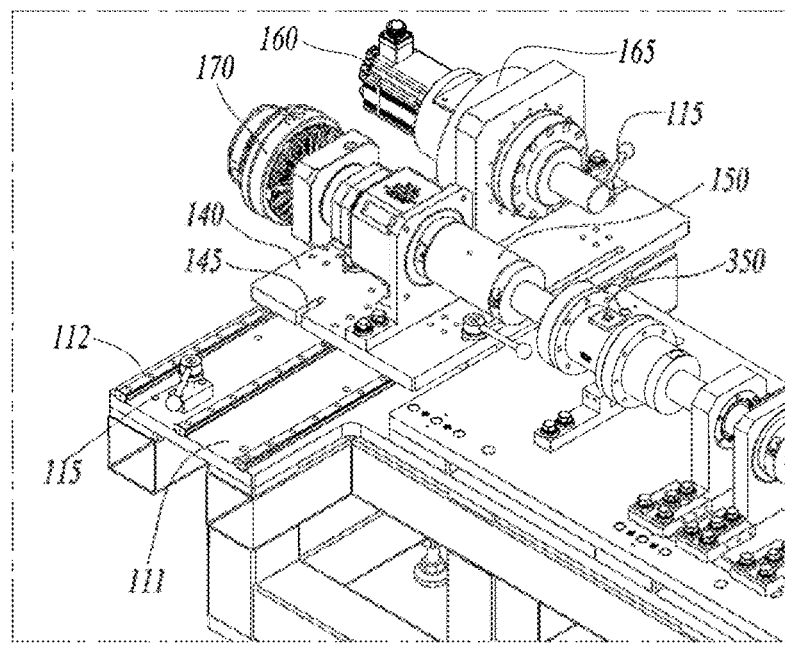
FIG. 8 is a partial perspective diagram illustrating a state in which a shaft connection member is moved toward an output-side rotary shaft in order to couple the output-side rotary shaft of an apparatus for evaluating performance to a rated torque brake.
FIG. 9 is a block diagram illustrating a configuration and connection relationship of a power interface.

FIG. 6 is a partial perspective diagram illustrating a process of connecting an output-side rotary shaft of an apparatus for evaluating performance to an output terminal motor or a rated torque brake by a shaft connection member. FIG. 7 is a perspective diagram illustrating that an output-side rotary shaft of an apparatus for evaluating performance is coupled to a rated torque brake by a shaft connection member. FIG. 8 is a partial perspective diagram illustrating a state in which a shaft connection member is moved toward an output-side rotary shaft in order to couple the output-side rotary shaft of an apparatus for evaluating performance to a rated torque brake.

The rotary shaft of the output terminal motor 160 and the output-side rotary shaft 320 may be connected by a shaft connection member 150 formed with a fastening hole to which the fastening member is fastened on an outer circumferential surface. The shaft connection member 150 may be formed with a fastening hole into which the fastening member is fastened in a radial direction at an outer circumferential surface of the end of the cylindrical member. Thus, by inserting each end of the rotary shaft of the output terminal motor 160 and the output-side rotary shaft 210 into the shaft connection member 215 and fastening the fastening member, the rotary shaft of the output terminal motor 160 and the output-side rotary shaft 320 may be shaft-coupled.

In addition, a shaft connection member 152 may be provided between the output shaft of the speed reducer 310 to be evaluated and the output-side rotary shaft 320. This shaft connection member 152 is configured in a similar form to the shaft connection member 150 described above. As will be described later, when no-load running torque is measured, the connection between the output shaft of the speed reducer 310 and the output-side rotary shaft 320 may be released by loosening the shaft connection member 152.

First, as illustrated in FIG. 1, in a state in which the shaft connection member 150 is biased toward the speed reducer 165 and coupled between the rotary shaft of the speed reducer 165 and the output terminal motor 160 and the output-side rotary shaft 320, the fastening member of the shaft connection member 150 is loosened and the shaft connection member 150 is moved along the output-side rotary shaft 320 so as to come into close contact with the torque sensor 350.

Next, as illustrated in FIG. 6, the output-side sliding plate 140 is slid to the right. In this connection, since the shaft connection member 150 is moved so as to come into close contact with the torque sensor 350, the shaft connection member 150 will not interfere with the rotary shaft of the output terminal motor 160 or the rotary shaft of the rated torque brake 170.

Next, as illustrated in FIG. 7, the output-side sliding plate 140 is moved so that the rotary shaft of the rated torque brake 170 comes to a position coincident with the output-side rotary shaft 320. Then, the output-side sliding plate 140 is fixed by tightening the fixing lever 115.

Next, as illustrated in FIG. 8, the shaft connection member 150 is moved to be in close contact with the speed reducer 165, and then the fastening member is fastened and fixed. Then, the rotary shaft of the rated torque brake 170 and the output-side rotary shaft 320 may be shaft-coupled. When the driving motor 220 is driven in this state, the efficiency of the speed reducer 310 to be evaluated may be measured.

The apparatus for evaluating performance according to an embodiment of the present disclosure may measure and calculate angular transmission error, hysteresis, hysteresis loss, repetition precision, ratcheting torque, no-load starting torque, output starting torque, no-load running torque, and efficiency of a speed reducer.

The angular transmission error may be calculated by measuring the rotational speed of an input terminal and the rotational speed of an output terminal with the output shaft at no load. In other words, the angular transmission error may be calculated from "(rotation angle of output terminal−rotation angle of input terminal)/speed reduction ratio."

The hysteresis may be calculated from the relationship between torque and angle. The hysteresis may be obtained by twisting the output terminal to a rated torque while the input terminal is fixed. In this connection, the degree of assembly of the speed reducer and the degree of shaft alignment of measurement equipment are required. In addition, it is necessary to minimize the torque basically applied to the output terminal according to the degree of alignment of the torque sensor 350 of the output unit 300.

It is necessary to minimize the twist generated when the input shaft is fixed. In addition, the rated torque is applied to the output shaft to twist the same to left and right. In this connection, since the twist angle affects rigidity, it is necessary to minimize the twist. To this end, the input-side rotary shaft 210 may be firmly mounted on the input-side sliding plate 130 by a plurality of rotary shaft support jigs 240, and the output-side rotary shaft 320 may be firmly mounted on the base plate 120 by a plurality of rotary shaft support jigs 330.

The hysteresis loss may be calculated from the difference between the angle values at a 3% point of the rated torque.

The repetition precision may be measured by repeatedly operating the input shaft in a specific section. In other words, the repetition precision may be measured based on a specific value of the final rotational position by repeatedly rotating the input-side rotary shaft 210 in a specific section. In this connection, the output terminal may measure the repetition precision by driving the driving motor 220 by designating the number of repetitions to a specific position by a user in a no-load state and measuring the final rotational position.

The ratcheting torque, also called buckling torque, is tested while increasing an output terminal torque while the input shaft is fixed. When the output terminal torque is gradually increased while the input-side rotary shaft 210 is fixed, a point where the rotation angle of the output terminal instantaneously increases appears, and the torque value at this moment may be referred to as ratcheting torque.

As a first method of measuring the ratcheting torque, the ratcheting torque may be measured by applying torque to the output terminal in an opposite direction to a rotational direction while the input terminal is driven at a constant speed. In this connection, since the evaluation apparatus may be damaged when a large amount of the output terminal torque is instantaneously applied, it is preferable to gradually increase the output terminal torque.

As a second method of measuring the ratcheting torque, the ratcheting torque may be measured while gradually increasing torque at the output terminal while the input terminal is fixed.

The no-load starting torque may be calculated by measuring the moment when the output terminal starts to rotate by gradually applying torque to the input terminal of the speed reducer while the output terminal of the speed reducer is in a no-load state. Specifically, only the encoder 340 is connected to the output-side rotary shaft 320 and is not connected to the output terminal motor 160. In this state, the driving motor 220 is operated to apply torque to the input-side rotary shaft 210, but the torque is increased by a certain amount every predetermined period. The previous measurement value of the output unit encoder 340 and the current measurement value of the output unit encoder 340 are compared at regular intervals. As a result of comparison, when the current measured value is large, the input terminal torque is not increased, and when there is no change, the input terminal torque is increased. When this process is repeated several times and it is determined that the output terminal rotates at the same speed for a certain period of time, the input terminal torque at this time may be used as the no-load starting torque.

The output starting torque is to measure the torque at the moment when the input terminal starts to rotate by gradually inputting torque to the output terminal of the speed reducer. The output starting torque may be obtained by operating in reverse from when the no-load starting torque is measured, and may be measured in a state in which all of the driving motor 220 to the output terminal motor 160 are connected.

However, after basic driving torque is measured by connecting a connection block instead of the speed reducer, the value obtained by subtracting the basic driving torque from the measured value of the output starting torque may be used as the output starting torque.

The no-load running torque refers to the torque required to rotate the input shaft of the speed reducer at high speed in a no-load state. A description will be made of a measurement method. In a state in which the output-side rotary shaft 320 is connected to the encoder 340, the connection with the output-side rotary shaft 320 is released by loosening the shaft connection member 152 at the output terminal of the speed reducer 310. When the driving motor 220 is operated to rotate the input-side rotary shaft 210 at 2000 rpm, a torque value is measured by the torque sensor 230. The test data may be expressed as a graph of input shaft torque versus rpm when driven up to 2000 rpm.

The efficiency of the speed reducer may be calculated by measuring rpm by rotating the input terminal after constantly applying the rated torque to the output terminal of the speed reducer. The specific measurement method is as follows.

When the input terminal is rotated in a state where the rated torque brake 170 is connected to the output-side rotary shaft 320 and a rated load is applied to the output terminal of the speed reducer 310, each of the input terminal torque and the input terminal rpm, and the output terminal torque and the output terminal rpm are measured simultaneously. In this connection, the efficiency may be obtained from the following formula.

$$\frac{\text{Output terminal torque} \times \text{Output terminal } rpm}{\text{speed reduction ratio}}$$
$$\overline{\text{Input terminal torque} \times \text{Input terminal } rpm}$$

The rated torque brake 170 is preferably a powder brake. In the powder brake, the powder is connected in a chain shape according to the magnetic flux generated by passing the current through a coil, and a braking operation is implemented by the connection force between the powders and the frictional force between the operating surfaces. The powder brake has a fast and precise response speed and a wide range of control because transmission torque may be varied, and thus torque may be adjusted and used. In addition, reliability is high because the torque transmitted to the output shaft is easily adjusted by voltage and may always be maintained constant. In addition, unlike general brakes, powder brakes transmit power by inducing slip, and thus may not apply any shock to mechanical devices.

Figure 10:
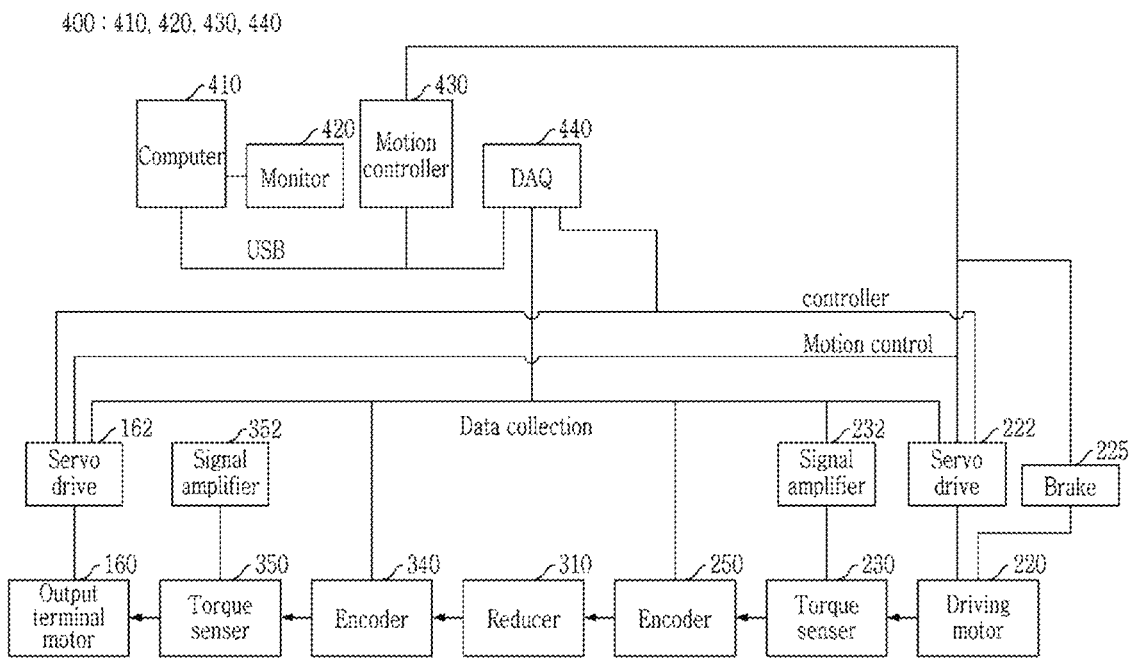
FIG. 10 is a block diagram illustrating a configuration and connection relationship of a control interface.

FIG. 9 is a block diagram illustrating a configuration and connection relationship of a power interface. FIG. 10 is a block diagram illustrating a configuration and connection relationship of a control interface.

The apparatus 100 for evaluating performance of a speed reducer of an embodiment of the present disclosure includes a control unit 400 that controls the operation of the driving motor 220 and the output terminal motor 160. The control unit 400 may calculate the performance of the speed reducer 310 from the measured values of the torque sensor 230 and the encoder 250 of the input unit 200, and the encoder 340 and the torque sensor 350 of the output unit 300.

A power device supplying power to the apparatus 100 for evaluating performance of a speed reducer may include a 220V three phase power supply 510 for driving the driving motor 220 and the output terminal motor 160, a 220V single phase power supply 520 for controlling a signal of the torque sensor 230 and 350, a 5V SMPS 530 for controlling the encoders 250 and 340, and a 24V SMPS 540 for controlling a brake 225 built in the driving motor 220.

As illustrated in FIG. 9, the 220V three phase power supply 510 may pass through a noise filter 512 and a magnetic switch 514 and may be connected to a servo drive 162, the output terminal motor 160, the servo drive 225, and the driving motor 220. The magnetic switch 514 regulates the input and output of power, and a contact is attached by an external power switch to allow power to flow into an internal circuit. When a general switch is used instead of the magnetic switch 514, burnout or sparking of the contact may occur due to its high voltage.

The 220V single phase power supply 520 may be connected to two SMPSs 530 and 540, a signal amplifier 352, and the torque sensor 350 through a noise filter 522 and a magnetic switch 524.

The 220V single phase power supply 520 may be connected to the signal amplifier 352 and the torque sensor 350 or to the signal amplifier 232 and the torque sensor 230 through the noise filter 522 and the magnetic switch 524.

The 5V SMPS 530 is a switch mode power supply, and is a device that receives power from the 220V single phase power supply 520 and supplies 5V power for controlling the encoders 250 and 340.

The 24V SMPS 540 is a device that receives power from the 220V single phase power supply 520 and supplies 24V power for controlling the brake 225 built in the driving motor 220.

As illustrated in FIG. 10, the control unit 400 may include a computer 410, a monitor 420, a motion controller 430, and a DAQ 440.

The computer 410 controls the entire evaluation device 100 and is connected to the monitor 420, the motion controller 430, and the DAQ 440, respectively.

The motion controller 430 is connected to a servo drive 222 and the brake 225 to control the movement of the driving motor 220, or connected to a servo drive 162 to control the movement (motion) of the output terminal motor 160.

The DAQ 440 is Data Acquisition, which is a general term for analog input, analog output, digital input/output and counter/timer measurement using DAQ hardware. Through a dedicated DAQ board, various data collection, motion control, and torque control may be performed collectively. The DAQ of NI uses a cRIO model, and cRIO may be equipped with input/output modules suitable for the purpose of use. The DAQ 440 may collect data from the two servo drives 222 and 162, the two signal amplifiers 232 and 352, and the two encoders 250 and 340. Analog voltage input and digital voltage input modules may be used for data collection.

The DAQ 440 is connected to the two servo drives 222 and 162 to control the torque of the two motors 220 and 160. In the case of torque control, the voltage of an analog signal between 0-10V may be applied using an analog voltage output module.

For motion control, a separate motion controller module may be used. The motion controller module is a pulse control method, and the rotation speed of a motor may be changed according to the speed of a pulse (Mpps, Mega Pulse Per Second). The dedicated motion controller 430 may perform precise control by receiving information from the encoders 250 and 340. Encoders built into the driving motor 220 and the output terminal motor 160 are connected to the motion controller 430, and the motion controller 430 may recognize current position information based on this information. The motion controller 430 may perform precise position control and speed control with the recognized current position information.

According to an apparatus for evaluating performance of a speed reducer of an embodiment of the present disclosure, the angular transmission error, hysteresis, hysteresis loss, repetition precision, ratcheting torque, no-load starting torque, output starting torque, no-load running torque, and efficiency of a harmonic speed reducer can be measured and calculated with one evaluation apparatus.

In addition, after a speed reducer to be evaluated is mounted on the evaluation apparatus and a motor or brake is connected, a control unit automatically controls the torque and motion, collects data, and calculates and displays various performance values.

Hereinbefore, the present disclosure has been explained based on the preferred example. However, it will be apparent to those skilled in the pertinent technical field that various changes and modifications may be made without departing from the idea of the present disclosure as described in the claims by adding, modifying, and deleting the constituents and that such changes and modifications are within the scope of right of the present disclosure.

The invention claimed is:

1. An apparatus for evaluating performance of a speed reducer, the apparatus comprising:
   a support frame;
   a base plate mounted on the support frame and configured to support a speed reducer to be evaluated;
   an input unit, which is mounted on an input-side rotary shaft connected to the speed reducer and includes a driving motor, a torque sensor and an encoder;
   an output unit, which is mounted on an output-side rotary shaft connected to the speed reducer and includes an encoder and a torque sensor;
   an output terminal motor selectively connected to the output-side rotary shaft; and
   a rated torque brake selectively connected to the output-side rotary shaft.

2. The apparatus of claim 1, wherein the input unit further comprises an input-side sliding plate on which the driving motor, the torque sensor, and the encoder are mounted and which is slidably mounted on the base plate in a rotary shaft direction.

3. The apparatus of claim 2, wherein the input-side sliding plate has a sliding member supported by a sliding rail provided on the base plate on a lower surface.

4. The apparatus of claim 1, wherein the output terminal motor and the rated torque brake further comprise an output-side sliding plate slidably mounted on the support frame in a direction perpendicular to a rotary shaft.

5. The apparatus of claim 4, wherein the output-side sliding plate has a sliding member supported by a sliding rail provided on the support frame on a lower surface.

6. The apparatus of claim 4, wherein the rotary shaft of the output terminal motor and the output-side rotary shaft are connected by a shaft connection member formed with a fastening hole to which a fastening member is fastened to an outer circumferential surface.

7. The apparatus claim 1, wherein the speed reducer to be evaluated is a harmonic speed reducer.

8. The apparatus of claim 7, wherein the apparatus for evaluating performance measures and calculates angular transmission error, hysteresis, hysteresis loss, repetition precision, ratcheting torque, no-load starting torque, output starting torque, no-load running torque, and efficiency of the speed reducer.

9. The apparatus of claim 1, further comprising a control unit that controls operation of the driving motor and the output terminal motor and calculates performance of the speed reducer from measured values of the torque sensor and the encoder of the input unit, and the encoder and the torque sensor of the output unit.

10. The apparatus of claim 9, wherein a power device supplying power to the apparatus for evaluating performance comprises:
   a 220V three phase power supply for driving the driving motor and the output terminal motor;
   a 220V single phase power supply for controlling a signal of the torque sensor;
   a 5V SMPS for controlling the encoder; and
   a 24V SMPS for controlling a brake built in the driving motor.

* * * * *